United States Patent [19]

Wang

[11] Patent Number: 5,414,770
[45] Date of Patent: May 9, 1995

[54] STRUCTURE OF MOBILE TELEPHONE RACK

[76] Inventor: Fore S. Wang, No. 174, Lane 131, Sec. 2, True Hsing Rd., Panchiao City, Taipei Hsien, Taiwan, Prov. of China

[21] Appl. No.: 225,550
[22] Filed: Apr. 11, 1994
[51] Int. Cl.$^6$ .............................................. H04M 1/00
[52] U.S. Cl. ..................................... 379/446; 379/454
[58] Field of Search ............... 379/446, 454, 455, 447, 379/449, 426, 450, 457; 387/86, 87; 248/309.1; 224/273, 42.42, 42.43, 42.44, 42.45 R

[56] References Cited

U.S. PATENT DOCUMENTS 5,179,590 1/1993 Wang .................................. 379/446

Primary Examiner—James L. Dwyer
Assistant Examiner—Jack Chiang
Attorney, Agent, or Firm—Bucknam and Archer

[57] ABSTRACT

A mobile telephone rack includes a rack body for holding a mobile telephone, a support and a plug rod securing the rack body to the socket for cigarette-lighter on a motor vehicle's instrument board, and a cigarette lighting socket connected to the socket for cigarette lighter through contacts on the plug rod, the support consisting of a bottom supporting rod having radial teeth meshed with respective radial teeth on the plug rod and fixed at the desired angle by a screw bolt and a top supporting rod having a bottom end revolvably fastened to the bottom supporting rod by a tightening up screw and a top end connected to the rack body by a steering rod, the steering rod having radial teeth meshed with respective radial teeth on the top supporting rod and fixed at the desired angle by a screw bolt.

2 Claims, 2 Drawing Sheets

STRUCTURE OF MOBILE TELEPHONE RACK

BACKGROUND OF THE INVENTION

The present invention relates to mobile telephone racks, and more particularly to such a mobile telephone rack for charging a mobile telephone and carrying it in an automobile.

U.S. Pat. No. 5,179,590 discloses a mobile telephone rack assembly for carrying a mobile telephone in an automobile. This structure of mobile telephone rack assembly is functional. However, because it is electrically connected to the socket for cigarette-lighter on a motor vehicle's instrument board, it must be removed from the socket for cigarette-lighter when one wishes to use the socket for cigarette-lighter for lighting cigarettes.

SUMMARY OF THE INVENTION

The present invention has been accomplished to provide an improved structure of mobile telephone rack which eliminates the aforesaid problem. To achieve this object, there is provided a mobile telephone rack comprised of a rack body for holding a mobile telephone, a support and a plug rod securing the rack body to the socket for cigarette-lighter on a motor vehicle's instrument board, and a cigarette lighting socket electrically connected to the socket for cigarette lighter through contacts on the plug rod.

DETAILED DESCRIPTION OF THE PREFERRED EMBODIMENT

Figure 1:
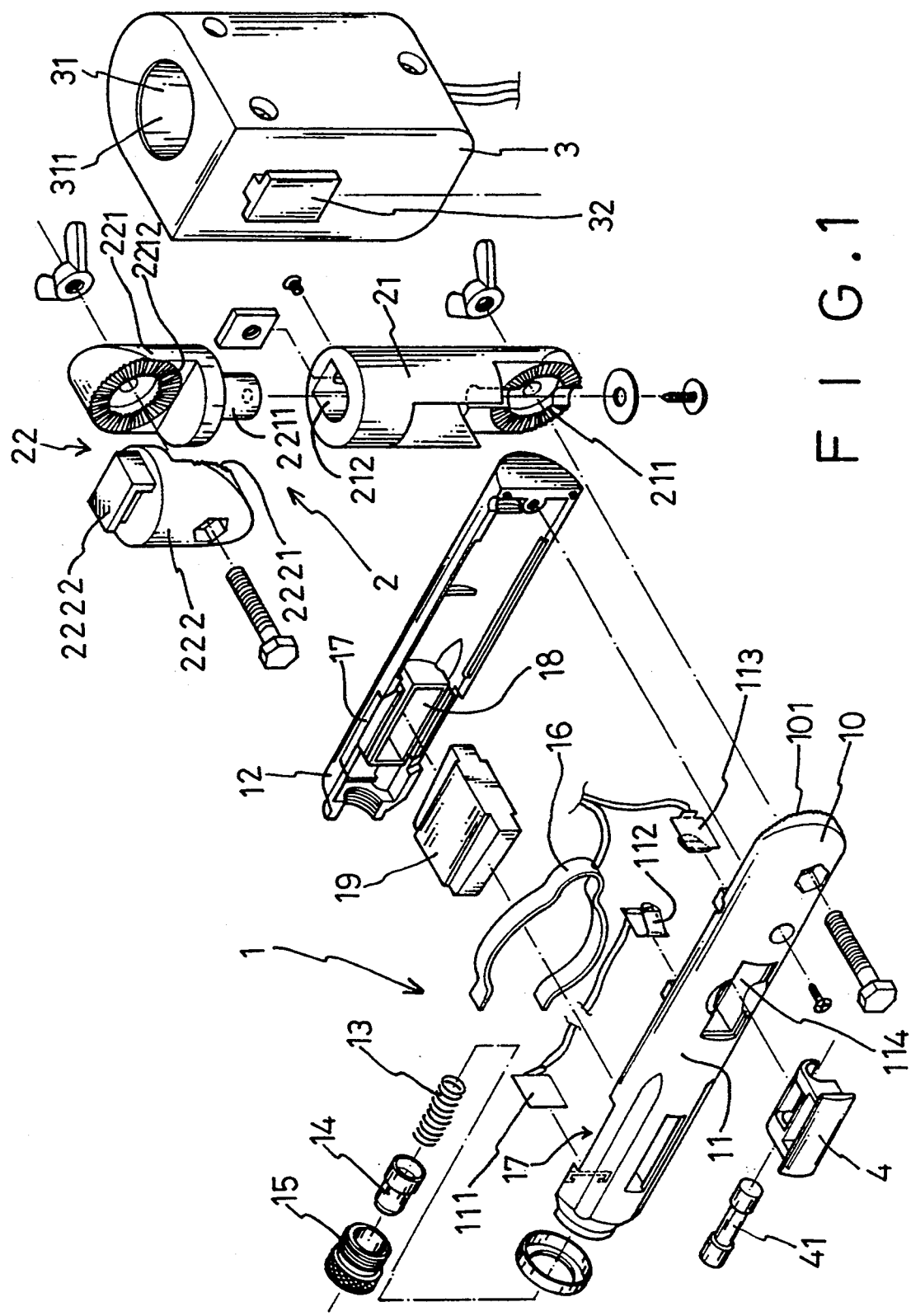
FIG. 1 is an exploded view of a mobile telephone rack according to the present invention.
Figure 2:
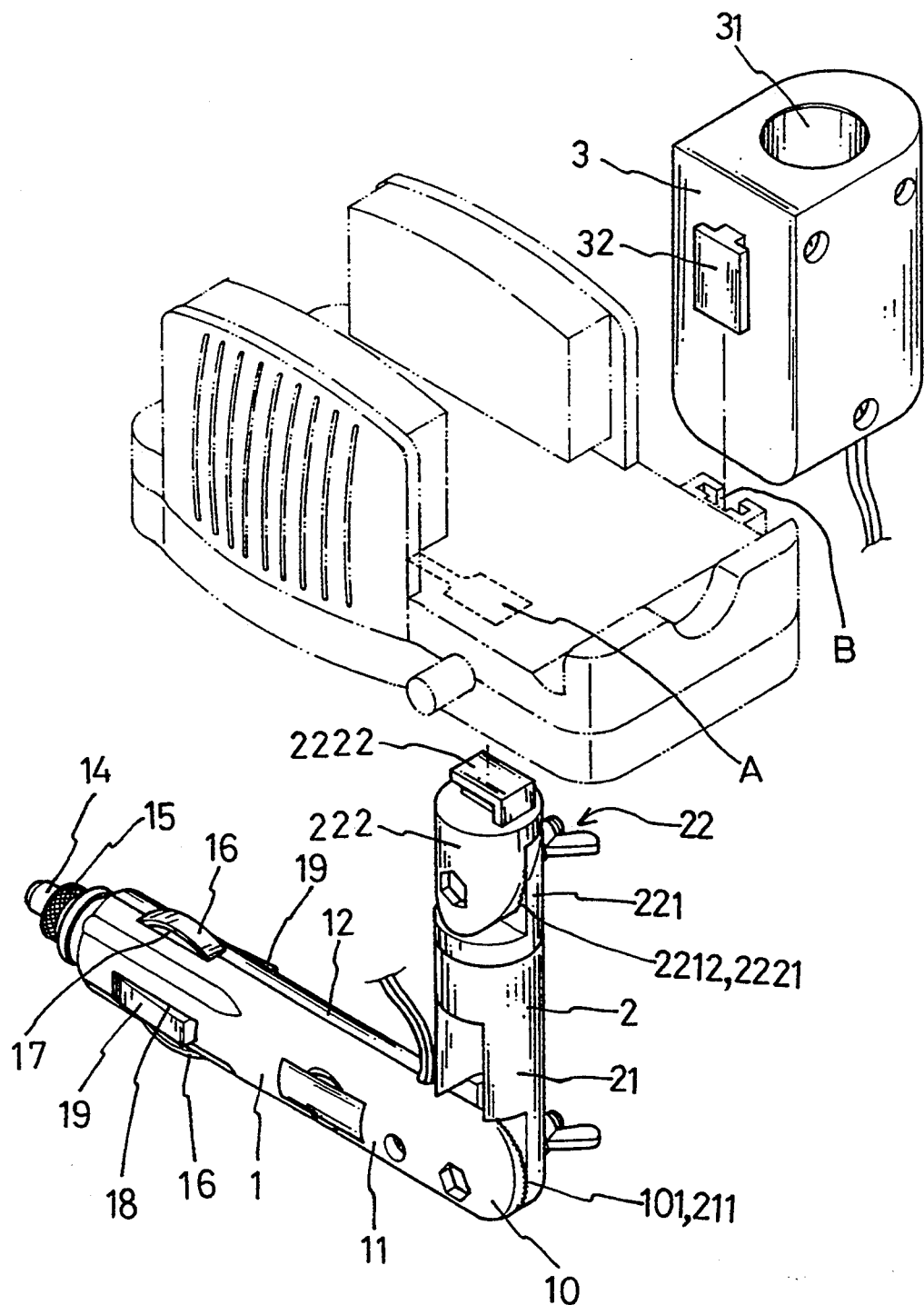
FIG. 2 shows the mobile telephone rack of FIG. 1 assembled.

Referring to FIGS. 1 and 2, the present invention is generally comprised of a plug rod 1, a support 2, a cigarette lighting socket 3, and a rack body for holding a mobile telephone.

The plug rod 1 is comprised of a first half shell 11 and a second half shell 12 fastened together by screws. A contact metal plug tip 14 is fastened to the front end of the plug rod 1 by a screw member 15 and supported on a spring 13 for making an electric contact with the center contact of the socket for cigarette-lighter on the motor vehicle's instrument board. A front contact metal plate 111, an intermediate contact metal plate 112, and a rear contact metal plate are disposed inside the plug rod 1, wherein the front and intermediate contact metal plates 111;112 are connected by an electric wire; the intermediate and rear contact metal plates 112;113 are connected by a fuse 41. Therefore, one pole of the socket for cigarette-lighter of the motor vehicle is transmitted through the rear contact metal plate 113 via the contact metal plug tip 14 and the front and intermediate contact metal plates 111;112. The opposite pole of the socket for cigarette-lighter is guided out by a curved contact metal spring plate 16. The curved contact metal spring plate 16 is mounted between two opposite grooves 17 on the inside wall of the plug rod 1, having two opposite parts projecting out of the plug rod 1 for making an electric contact with the side contact of the socket for cigarette-lighter. A positioning block 19 is mounted in a chamber 18 inside the plug rod 1 to support the curved contact metal spring plate 16 in place. When the plug rod 1 is fastened to the socket for cigarette-lighter, the positioning block 19 and the curved contact metal spring plate 16 touch the inside wall (side contact) of the socket for cigarette-lighter at the four angles of a square, and therefore the plug rod 1 is firmly retained to the socket for cigarette-lighter. The curved contact metal spring plate 16 and the rear contact metal plate 113 are connected with a respective conductor being extended out of the rear end of the plug rod 1. The first half shell 11 has a rear extension 10 projecting over the rear end of the second half shell 12 in the longitudinal direction. The rear extension 10 has radial teeth 101 made on an inner side thereof around a circle for connection to the support 2.

The support 2 is comprised of a bottom supporting rod 21 and a top supporting rod 22. The bottom supporting rod 21 has radial teeth 211 made near the bottom end around a circle for connection to the radial teeth 101 on the rear extension 10 of the first half shell 11 of the plug rod 1. When the radial teeth 101;211 are meshed together, the plug rod 1 and the bottom supporting rod 21 are fixed by a screw bolt. The bottom supporting rod 21 further comprises a center hole 212 on the top end thereof for mounting the top supporting rod 22. The top supporting rod 22 is comprised of a bottom connecting rod 221 and a top steering rod 222. The bottom connecting rod 221 comprises a bottom extension rod 2211 inserted into the center hole 212 on the bottom supporting rod 21 and fixed in position by a tightening-up screw, and radial teeth 2212 disposed in the vertical direction around a circle for connection to the top steering rod 222. The top steering rod 222 comprises radial teeth 2221 at the bottom meshed with the radial teeth 2212 on the bottom supporting rod 221 and then fixed in position by a screw bolt, and a hooked top extension 2222 for connection to a respective retaining hole A on the rack body.

The cigarette lighting socket 3 comprises a center hole 31 having a side contact 311 and a center contact 312 (not shown) insulated from the side contact 311, and a hooked side extension 32 for connection to a retaining hole B on the rack body. The side contact 311 and center contact 312 are respectively connected to the conductor of the curved contact metal spring plate 16 and the conductor of the rear contact metal plate 113.

Referring to FIG. 2 again, when the plug rod 1 is fastened to the socket for cigarette-lighter, the curved contact metal spring 16 and the positioning block 19 are disposed in contact with and stopped against the side contact (inside wall) of the socket for cigarette-lighter and the contact metal plug tip 14 is connected to the center contact thereof. Because the bottom support rod 21 is fixed to the rear extension 10 by a screw bolt, the angular position of the bottom support rod 21 on the rear extension 10 can be adjusted by loosening the nut on the screw bolt and changing the order of engagement between the radial teeth 101 on the rear extension 10 and the radial teeth 211 on the bottom supporting rod 21. Similarly, the angular position of the top steering rod 222 (the rack body) on the bottom connecting rod 221 can also be conveniently adjusted.

The aforesaid fuse 41 is carried on a fuse holder 4 being installed in a side slot 114 on the first half shell 11 of the plug rod 1. When overload, the fuse 41 is broken to cut off power supply. The fuse holder 4 can be conveniently removed from the plug rod 1 for replacing the fuse 41.

While only one embodiment of the present invention has been shown and described, it will be understood that various modifications and changes could be made without departing from the spirit and scope of the invention.

What is claimed is:

1. A mobile telephone rack of the type having a rack body for holding a mobile telephone permitting it to be charged to the saturation state, the improvement comprising:

a plug rod which comprises a plug rod body formed of a first half shell and a second half shell fastened together by screws, a contact metal plug tip fastened to said plug rod body at a front end thereof by a screw member and supported on a spring for making an electric contact with a center contact of a socket for cigarette-lighter on a motor vehicle's instrument board, a front contact metal plate received inside said plug rod body and connected to said contact metal plug tip, an intermediate contact metal plate connected to said front contact metal plate, a rear contact metal plate connected to said intermediate contact metal plate by a fuse, a curved contact metal spring plate supported on a positioning block inside said plug rod body and having two opposite sides projecting out of said plug rod body for making an electric contact with a side contact of the socket for cigarette-lighter, said first half shell having a rear extension, the rear extension having a toothed portion comprised of a plurality of radial teeth disposed around a circle;

a support which is comprised of a bottom supporting rod and a top supporting rod, said bottom supporting rod having a toothed portion comprised of a plurality of radial teeth disposed around a circle and meshed with the toothed portion on the rear extension of said first half shell of said plug rod and then fixed in position by a screw bolt and having a center hole on a top end thereof, said top supporting rod comprised of a bottom connecting rod and a top steering rod, said bottom connecting rod of said top supporting rod comprising a bottom extension rod and a toothed portion, the bottom extension rod of said bottom connecting rod of said top supporting rod being inserted into the center hole on said bottom supporting rod and fixed in position by a tightening-up screw, the toothed portion of said bottom connecting rod of said top supporting rod being comprised of a plurality of teeth disposed around a circle, said top steering rod having a toothed portion and a hooked top extension connected to the rack body of the mobile telephone rack by a hooked joint, the toothed portion of said top steering rod comprised of a plurality of teeth disposed around a circle and meshed with the toothed portion on said bottom connecting rod and fixed in position by a screw bolt; and a cigarette lighting socket which comprises a center hole having a side contact and a center contact respectively connected to said curved contact metal spring plate and said rear contact metal plate, and a hooked side extension connected to the rack body of the mobile telephone rack by a hooked joint.

2. The mobile telephone rack of claim 1 wherein said fuse is carried on a fuse holder inserted into said plug rod through a side hole thereof.

* * * * *